Feb. 12, 1957  G. B. BOOTH ET AL  2,781,461
ELECTROMAGNETIC VIBRATION EXCITER
Filed April 15, 1953  2 Sheets-Sheet 1

Inventors
Galt B. Booth
William G. Brown
Karl Unholtz
By their attorneys

Howson and Howson

Feb. 12, 1957  G. B. BOOTH ET AL  2,781,461
ELECTROMAGNETIC VIBRATION EXCITER
Filed April 15, 1953  2 Sheets-Sheet 2

*Inventors*
*Galt B. Booth*
*William G. Brown*
*Karl Unholtz*
By their attorneys

*Howson and Howson*

United States Patent Office 2,781,461
Patented Feb. 12, 1957

2,781,461
ELECTROMAGNETIC VIBRATION EXCITER

Galt B. Booth, Short Beach, William G. Brown, Guilford, and Karl Unholtz, Woodbridge, Conn., assignors, by mesne assignments, to Textron American, Inc., Providence, R. I., a corporation of Rhode Island Application April 15, 1953, Serial No. 349,054

4 Claims. (Cl. 310—27)

This invention relates to electromagnetic vibration exciters for converting alternating electric currents into reciprocating mechanical force, and more particularly to a driver coil therefor.

The object of the present invention is to achieve stable operation of the driver coil assembly of an exciter, more particularly those having large excursions of the driver coil assembly.

Whenever a non-uniform flux density exists in and near the airgap of an electromagnetic vibration exciter, and when, due to this non-uniform or variable flux density and the finite length of the driver coil, the flux linkages between the driver coil current and the field flux vary as a function of the position of the driver coil with relation to the airgap, irregular movement and overtravel are likely to result. Any axial excursion of the moving table assembly greater than that intended for normal operation in the design of the equipment is known as "overtravel." We have discovered that it is possible to use non-uniform windings on the driver coil assembly of a vibration exciter and thereby stop large excursions of the assembly.

It is characteristic of the present invention that the non-uniform windings used as a driver coil make the excursion of the driver coil assembly more sinusoidal and stabilize the driver coil against overtravel.

In the drawings:

In Figs. 7–10 the supplementary winding is connected in the opposite sense from the main winding so that the force generated by it opposes the force generated by the main winding.

Figure 1:
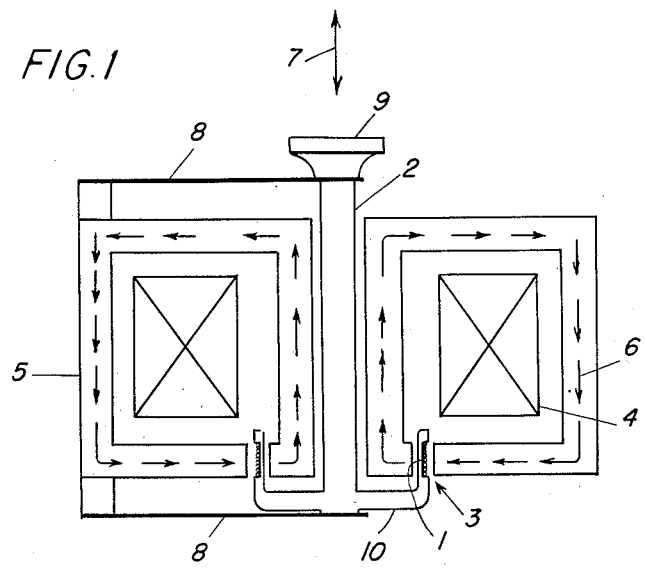
Fig. 1 is a diagrammatic view in vertical section through a common form of electric vibration exciter.
Figure 2:
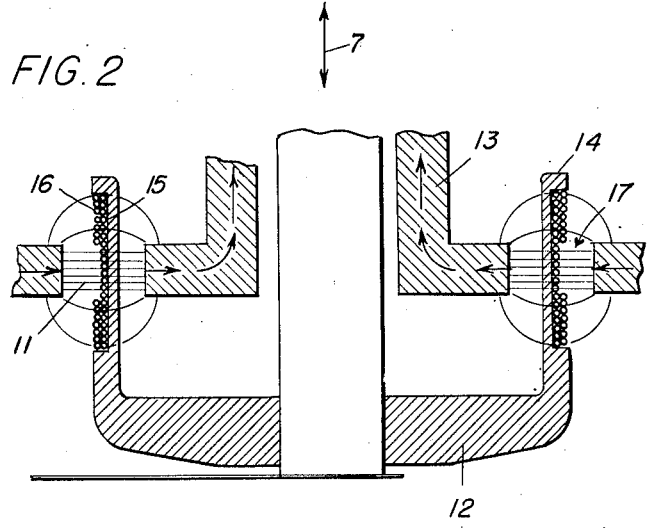
Fig. 2 is a view in vertical section on an enlarged scale through the driver coil assembly and airgap of an electric vibration exciter embodying our invention.
Figure 3:
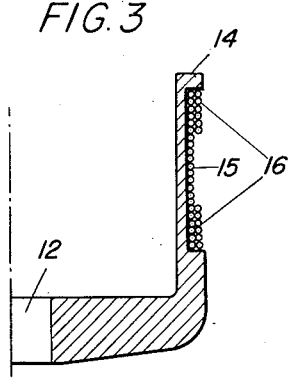
Fig. 3 is a diagram in vertical section on the enlarged scale of Fig. 2 through one side of a simple embodiment of our exciter, showing the position of the main and supplementary windings.

We will first describe the operation of the common form of vibration exciter shown in Fig. 1. The force generated by the vibration exciter is derived from a current flowing in the driver coil 1 mounted on the driver assembly 2. The coil is on a portion of the driver 10 positioned in an airgap 3 of high magnetic flux density. The high magnetic flux density is obtained by connecting the stationary field coil 4 to a suitable direct current voltage. This field coil is carried by a stationary magnetic structure 5, which latter offers a continuous path of low reluctance to the resulting magnetic flux 6 except for the region of the airgap occupied by the driver coil. Due to the shape of the magnetic structure, most of the flux set up in the structure is forced to cross the airgap and therefore also the wires of the driver coil. This can be seen for example, by the lines 11 of Fig. 2. With this setup the directions of the generated force are as indicated by the double-headed arrow 7. The direction of the force may be reversed by reversing the direction of the current in the driver coil. The magnitude of the generated force is proportional at any instant to the magnetizing effect of the current flowing in the driver coil, and the flux density in the airgap. If the magnetic structure is of adequate size and maintains a constant, uniform flux density independent of the current in the driver coil, then the generated force is proportional to the current in the driver coil. Furthermore, the generated force is independent of the motion of the driver and is dependent only on the value of the current in the driver coil. The exciter as shown in this figure has flexures 8 to support the driver assembly flexurally. They constrain the motion of the driver to substantially a straight line provided the amplitude of vibration is small. There is the usual table 9 on one end of the driver assembly.

A study of the motion of the moving system of this vibration exciter of the prior art reveals that the force applied to the moving system by the interaction of the current in the driver coil and the flux in the airgap is related to the deflection of the moving system from its neutral or rest position, the mass of the moving system and the spring rate of the flexures (flexible members), in accordance with the following approximate equation of motion:

$$m\frac{d^2x}{dt^2} + kx = P_0 \sin wt \qquad (1)$$

In this equation, $x$ is the deflection of the moving system from its rest position, $m$ is the mass of the moving system, $k$ is the spring rate of the flexures, and $P_0 \sin wt$ is the force applied to the moving system by the interaction of the current in the driver coil and the flux in the airgap. Rewriting the equation in terms of the resonant frequency of the moving system, where $$w_0 = \sqrt{\frac{k}{m}}$$

is the resonant frequency, we have:

$$d^2x_{dt^2} + w_0^2 x = \frac{P_0}{m} \sin wt \qquad (2)$$

For frequencies $w$ greater than $w_0$, this equation has a solution of the form:

$$x = -X_0 \sin wt \quad (3)$$

where $$X = \frac{P_0}{m(w^2 - w_0^2)}$$

is the amplitude of motion.

However, in an actual system the number of flux linkages between the driver coil and the magnetic field varies, and the driving force coefficient $P_0$ becomes a function of the deflection $x$ of the moving assembly from its rest position. Then, instead of the simple case previously described, the motion of the moving assembly becomes unstable at driving frequencies above the frequency of resonance, distortion of the desired motion is caused and the driver coil tends to move completely out of the airgap. The equipment generally is operated at a frequency above that of the suspension.

In the simple case first described, a comparison of Equation 3 with Equations 1 and 2 shows that the motion and the force have opposite signs so that when the coil attempts to move out of the airgap, the applied force tends to restore the coil to its neutral position.

This relationship still holds when the number of flux linkages between the magnetic field and the driver coil varies, i. e., when $P_0$ becomes a function of $x$. Thus, here again the motion and the force have opposite signs and the applied force tends to restore the coil to its neutral position.

We have found that trouble occurs when the driver coil moves so far as to reduce the flux linkages between the magnetic structure and the coil. This reduces the effectiveness of the current in the driver coil, and the magnitude of the driving force coefficient $P_0$ diminishes for large amplitudes of motion $x$. It may then be seen that if the neutral position of the coil is asymmetrically disposed with reference to the stationary magnetic structure, the force tending to push the coil toward the center of the magnetic structure when the coil is farthest from its center, is less than the force tending to push the coil toward the center of the magnetic structure at the opposite excursion of motion. Heretofore, this force differential has caused the coil to walk progressively out of the airgap until the unbalanced force was balanced by an increased stress in the flexures or until the coil hit a mechanical stop.

Our invention relates to means for stabilizing the above actual system by keeping the driver assembly in proper relation to the airgap and is particularly useful in cases where a very soft suspension is desirable. (It should be understood that the invention is equally useful in suspensions where there are flexures and where there are no flexures.) We have discovered that the system can be stabilized by means of non-uniform or varied windings in the coil.

We will now describe the embodiment of the invention shown in Figs. 2–6. The driver 12 is at the bottom of the driver assembly, as was the driver 10 in the prior art construction of Fig. 1. The driver has a sleeve or coil form 14 extending upwardly through and above or beyond the airgap 17 formed in the magnetic structure 13. This coil form 14 is recessed around its outer face deeply enough to receive main electric windings 15 and supplementary electric windings 16 (see Figs. 2 and 3). The recess normally extends some distance on both sides of the airgap 17 and also on both sides of the dense flux lines 11 which proceed straight across the airgap (see Fig. 2). The curved lines adjacent to the flux lines 11 are intended to indicate the weaker lines of flux that lie outside the airgap itself.

Figure 4:
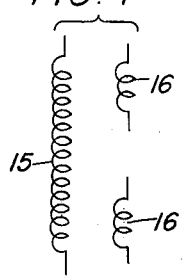
Fig. 4 is a diagram illustrating the general character of the windings of Fig. 3.
Figure 5:
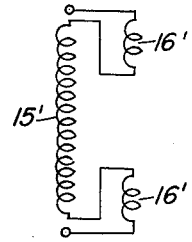
Fig. 5 shows one form of connecting the windings of Figs. 3 and 4, the supplementary windings in this figure being shown connected in series with the main winding and so disposed that the force generated by the currents in the supplementary windings acts in the same direction as the force generated by the main winding.
Figure 6:
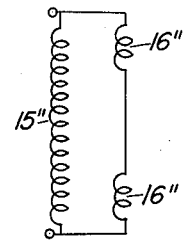
Fig. 6 is an alternate form of connecting the windings of Figs. 3 and 4, showing the two supplementary windings connected in parallel with the main winding.
Figure 7:
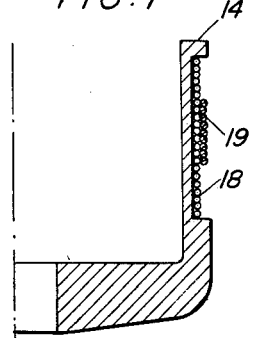
Fig. 7 is a view similar to Fig. 3 of a modified form of winding in which a supplementary winding is located at the middle of the main winding.

The main winding 15 extends for the full height, i. e., length, of the recess and therefore extends both above and below the dense flux lines 11. The supplementary windings 16 are in the coil form outside the main winding 15 but lie above and below the dense flux lines 11 and outside the airgap when the driver is in its neutral or rest position. Fig. 4 illustrates the fact that in this embodiment there is one continuous main winding 15 and two separate supplementary windings 16, one located at the upper end of the recess and the other at the lower end. Fig. 5 illustrates how two supplementary windings 16' can be connected in series with a main winding 15'. It is also possible to connect two supplementary windings 16'' in parallel with a main winding 15'', as shown in Fig. 6. All these supplementary windings are connected in the same sense as the main winding, so that the force generated by currents in those additional or supplementary windings is in the same direction as the force generated by the main winding. As suggested above, the supplementary windings are so placed on the coil form 14 that they contribute little force if the neutral or center position of the coil form is at or near the center of the magnetic structure. The neutral position of the moving element is the rest position it will assume under fixed conditions of load and angular position which will permit nearly equal excursion in each direction before encountering mechanical stops. It is generally the center of the axial length of the airgap. However, if the neutral position of the coil form tends to move out of the airgap in the unstable manner described above, one of the supplementary windings tends to move into the airgap and produces an additional restoring force which stabilizes the system. The instability is caused by the fact that the driving force coefficient $P_0$ decreases upon large deflections of the moving system from its rest position. By the use of these supplementary windings the driving force coefficient $P_0$ can be made practically independent of the deflection or position $x$ of the moving system or can even be made to increase when there are large values of deflection of the moving system.

Figure 8:
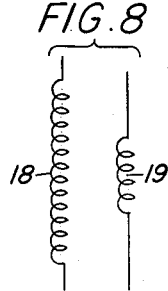
Fig. 8 is a diagram similar to Fig. 4 of the windings of Fig. 7.
Figures 9, 10:
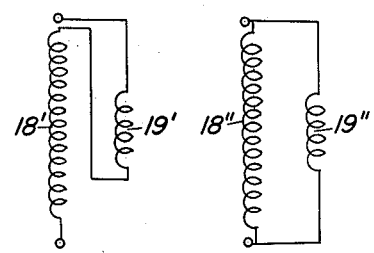
Fig. 9 is a view similar to Fig. 5 showing a supplementary winding like that of Fig. 7 connected in series with the main winding.
Fig. 10 is an alternate form of connecting windings like those of Fig. 7, showing the supplementary and main windings connected in parallel.
Figure 11:
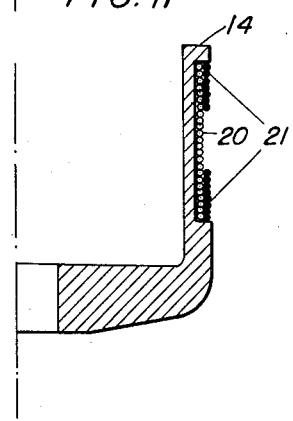
Fig. 11 shows the third embodiment of the invention, similar to Figs. 3 and 7, the supplementary windings in this case being furnished with direct current in contrast to the previous figures.

In Figs. 7–10 we have shown another embodiment of our invention. In this embodiment the supplementary winding, instead of being wound in the same sense as the main winding and placed at the ends of the driver coil as in Figs. 2–6, is wound in the opposite sense from the main winding. The main winding is indicated in Fig. 8 by the reference character 18, and the single supplementary winding by the character 19. This winding 19 is wound in the opposite sense, as already stated, and is placed in the center of the driver coil. As in the case of the construction of Figs. 3–6, the main and supplementary windings can be connected in series or parallel, as desired. In Fig. 9 a main winding 18' is shown diagrammatically connected in series with a supplementary winding 19'. In Fig. 10 a main winding 18'' is shown diagrammatically connected in parallel with a supplementary winding 19''. It will be noted from Figs. 7–10 that the supplementary winding will be located opposite the middle of the main winding when considered in a vertical direction. In view of this arrangement, when the neutral position of the coil form is at or near the center of the airgap, vertically speaking, it can be said that the effective force $P_0 \sin wt$ is the difference between the forces contributed by the main winding and the supplementary winding. However, if the neutral or center position of the coil form tends to move out of the airgap in the manner described above, a portion or section of the coil form beyond the end of the supplementary winding becomes increasingly effective. This we have found to be true because in this section beyond the supplementary winding the force generated by that winding no longer subtracts with the same relative effectiveness from the force generated by the main winding. The result is that a net increase of restoring force occurs which stabilizes the system in much the same manner as in the embodiment shown in Figs. 3–6. It will be seen that by the use of this central opposed supplementary winding, the driving force coefficient $P_0$ can be made practically independent of the amount of deflection $x$ of the moving system from its raised position, or it can be made to increase for large deflections *x*, thus producing stability in the structure.

Figure 12:
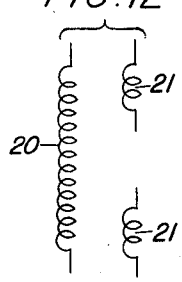
Fig. 12 is a diagram similar to Figs. 4 and 8 of the windings of this third embodiment.
Figure 13:
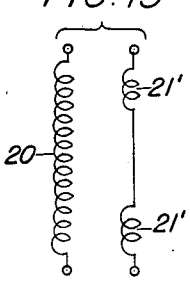
Fig. 13 shows one manner of connecting windings similar to those of Fig. 11 in which the two supplementary windings are connected in series with each other.
Figure 14:
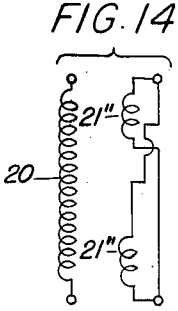
Fig. 14 is a diagram illustrating an alternate circuit for the third embodiment of Fig. 11 in which the direct current windings are connected in parallel with each other.

The two embodiments so far described involve the use of only one current in the driver coil. It is possible to obtain the same useful results from embodiments involving more than one current in the driver coil. The embodiment shown in Figs. 11–14 is one in which two currents of different kinds are employed. The location of the wires in the coil form 14 is shown in vertical diagram in Fig. 11 and it will be noted that it is similar to Fig. 3 in the respect that there are supplementary windings 21 at the ends of the driver coil outside the main winding 20. While the coil of Fig. 11 has general resemblance to the coil of Figs. 2 and 3, and the main winding 20 is energized by alternating current, the supplementary windings 21 are energized by direct current. Fig. 12 is a diagrammatic llustration of the disposition or general location of the three windings, namely, the one main winding 20 and the two supplementary ones 21. Fig. 13 illustrates how two direct current windings 21' are connected in series to each other but, of course, are in no way connected to the main winding 20. Fig. 14 illustrates an alternate way of connecting the windings, namely, one in which two supplementary windings 21" are connected in parallel with each other, the separation from the main winding, of course, being maintained in this Fig. 14 as it was in Fig. 13. These direct current windings are wound in a manner such that each winding provides a force tending to center the coil form vertically in the airgap if the coil form is so moved that the direct current winding moves into the airgap. For this purpose these direct current windings are so wound or energized as to produce opposing electromotive forces. As in the case of the embodiments of Figs. 2–10, the coil form is taller than the airgap so that the direct dense flux lines 11 do not pass through the direct current supplementary windings if the coil form is centered in the gap. Thus, if the coil form tends to walk out of the airgap in the unstable manner described above, one of these direct current windings becomes effective and exerts a restoring force to the system, thus producing stability.

Although series and parallel connections of these windings are shown in Figs. 5, 6, 9, 10, 13 and 14, it is not intended to exclude other possible configurations which accomplish the same result.

The windings in the coil form of moving assemblies according to our invention have two functions. They cause reciprocatory motion of more sinusoidal form; and they provide stabilizing means which prevent overtravel of the reciprocatory motion. Windings can be provided in the coil form to divide up these functions in any desired order, the essential point of the invention being that there are irregular, i. e., non-uniform, windings adapted to correct the motion of the moving assembly. In the forms shown, these non-uniform windings have taken the form of auxiliary turns, i. e., supplementary windings that are irregularly located in comparison to the main winding and, being different in character from the main winding, can be taken advantage of to produce the desirable results.

The description given above is based on the assumption that we are operating above the resonant frequency of the moving assembly on the flexures. Below resonance, the stabilizing action is not required. However, the additional winding shown will still provide a wave form correction which improves the operation of the machine.

What is claimed is:

1. In an electromagnetic vibration exciter, a magnetic structure having an air gap and a moving assembly having driver coil means adapted to move in the air gap, wherein the driver coil means contains the combination of a direct current supply and windings through all or part of which the direct current shall be caused to flow to furnish force tending to maintain the moving assembly centered in the air gap; said windings also including variations therein adapted to prevent overtravel of the assembly.

2. In an electromagnetic vibration exciter, a magnetic structure having an airgap and a moving assembly having a driver coil adapted to move in the airgap, in which the driver coil contains a main winding in combination with at least two supplementary windings and a direct current supply; the supplementary windings being so located at the ends of the coil and connected to each other and to the direct current supply as to provide forces tending to center the driver coil in the airgap.

3. In an electromagnetic vibration exciter according to claim 2, the combination in which the supplementary windings are connected in series.

4. In an electromagnetic vibration exciter according to claim 2, the combination in which the supplementary windings are connected in parallel.

References Cited in the file of this patent

UNITED STATES PATENTS

| | | |
|---|---|---|
| 1,895,071 | Fanger | Jan. 24, 1933 |
| 1,953,542 | Pridham | Apr. 3, 1934 |
| 2,118,862 | Rayment | May 31, 1938 |
| 2,555,365 | Page | June 5, 1951 |
| 2,556,816 | Lukacs | June 12, 1951 |
| 2,599,036 | Efromson et al. | June 3, 1952 |

FOREIGN PATENTS

| | | |
|---|---|---|
| 722,732 | Germany | July 20, 1942 |